United States Patent
Tsunematsu

(10) Patent No.: US 10,146,992 B2
(45) Date of Patent: Dec. 4, 2018

(54) IMAGE PROCESSING APPARATUS, IMAGE PROCESSING METHOD, AND STORAGE MEDIUM THAT RECOGNIZE AN IMAGE BASED ON A DESIGNATED OBJECT TYPE

(71) Applicant: CANON KABUSHIKI KAISHA, Tokyo (JP)

(72) Inventor: Yuichi Tsunematsu, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/631,728

(22) Filed: Jun. 23, 2017

(65) Prior Publication Data
US 2017/0286758 A1 Oct. 5, 2017

Related U.S. Application Data

(63) Continuation of application No. 14/709,589, filed on May 12, 2015, now Pat. No. 9,721,153.

(30) Foreign Application Priority Data

May 21, 2014 (JP) .................. 2014-105506

(51) Int. Cl.
*G06K 9/00* (2006.01)
*G06K 9/46* (2006.01)
(Continued)

(52) U.S. Cl.
CPC ..... *G06K 9/00288* (2013.01); *G06K 9/00221* (2013.01); *G06K 9/00362* (2013.01);
(Continued)

(58) Field of Classification Search
CPC .......... G06K 9/00221; G06K 9/00288; G06K 9/00362; G06K 9/46; G06K 2009/00322;
(Continued)

(56) References Cited

U.S. PATENT DOCUMENTS

2011/0019066 A1* 1/2011 Takano .................. G03B 13/20
348/345
2011/0194732 A1* 8/2011 Tsuji ...................... G06K 9/036
382/103

(Continued)

FOREIGN PATENT DOCUMENTS

CN 101295354 A 10/2008
CN 102147856 A 8/2011
(Continued)

OTHER PUBLICATIONS

R. Szeliski, "Computer Vision: Algorithms and Applications", Mar. 2013, Chapter 4, 4.1, pp. 180-205, Chapter 14, 14.1, pp. 572-595, published by Kyoritsu Shuppan Co., Ltd.
(Continued)

*Primary Examiner* — Amara Abdi
(74) *Attorney, Agent, or Firm* — Rossi, Kimms & McDowell LLP

(57) ABSTRACT

An image processing apparatus including an acquisition unit configured to acquire results of analysis processing for a plurality of images; a designation unit configured to designate a type of a target to be detected from an image; and a determination unit configured to determine, among the plurality of images, an image used for detection processing of the detection target designated by the designation unit based on the type of the detection target designated by the designation unit and the result of the analysis processing.

10 Claims, 9 Drawing Sheets

(51) Int. Cl.
*H04N 5/232* (2006.01)
*G06T 7/70* (2017.01)
*G06T 7/60* (2017.01)

(52) U.S. Cl.
CPC .............. *G06K 9/46* (2013.01); *G06T 7/60* (2013.01); *G06T 7/70* (2017.01); *H04N 5/23206* (2013.01); *H04N 5/23229* (2013.01); *G06K 2009/00322* (2013.01); *G06K 2009/00328* (2013.01)

(58) Field of Classification Search
CPC ..... G06K 2009/00328; H04N 5/23206; H04N 5/23229; G06T 7/60; G06T 7/70
See application file for complete search history.

(56) References Cited

U.S. PATENT DOCUMENTS

| | | | |
|---|---|---|---|
| 2011/0301956 A1* | 12/2011 | Sano | G06F 3/012 704/270 |
| 2013/0070973 A1 | 3/2013 | Saito et al. | |
| 2013/0194110 A1 | 8/2013 | Kim et al. | |
| 2013/0329964 A1* | 12/2013 | Nishi | G06K 9/00362 382/110 |
| 2014/0334718 A1 | 11/2014 | Yamada et al. | |
| 2015/0010103 A1 | 1/2015 | Murakami et al. | |

FOREIGN PATENT DOCUMENTS

| | | | |
|---|---|---|---|
| CN | 102170563 A | 8/2011 | |
| JP | 2002373332 A | 12/2002 | |
| JP | 2010271817 A | 12/2010 | |
| JP | 2010-0271817 | * 12/2012 | ............. G06T 7/20 |
| JP | 5193944 B2 | 5/2013 | |

OTHER PUBLICATIONS

Office Action issued in U.S. Appl. No. 14/709,589 dated Jun. 10, 2016.
Office Action issued in U.S. Appl. No. 14/709,589 dated Nov. 30, 2016.
Notice of Allowance issued in U.S. Appl. No. 14/709,589 dated Mar. 24, 2017.
Office Action issued in Chinese Appln. No. 201510254139.3 dated Apr. 28, 2018. English translation provided.
Changjiang Zhang. "Digital Image Processing & Application Thereof." Dec. 31, 2013: 299. Tsinghua University Press. Cited in NPL 1. English translation of NPL 1, which discusses document, is provided.

* cited by examiner

FIG. 4

| IMAGE NUMBER | 500 |
|---|---|
| DIRECTION OF HUMAN BODY | LEFT |
| DIRECTION OF FACE | LEFT |
| PHOTOGRAPHED REGION | WHOLE BODY |
| SUBJECT FACE COORDINATES (x, y, width, height) | 125, 200, 75, 75 |
| SUBJECT WHOLE BODY COORDINATES (x, y, width, height) | 120, 200, 100, 300 |
| SUBJECT FACE SIZE | 5,625 |
| SUBJECT WHOLE BODY SIZE | 10,000 |
| FACE IMAGING SCORE | 700 |
| HUMAN BODY IMAGING SCORE | 600 |

FIG. 6

| RECOGNITION PRECONDITION | | SCORE | RECOMMENDED IMAGE | RECOMMENDED PROCESSING REGION (x, y, width, height) |
|---|---|---|---|---|
| DIRECTION OF BODY | FRONT | 600 | 100 | 25, 500, 150, 150 |
| | BACK | — | — | — |
| | RIGHT | 550 | 200 | 75, 25, 150, 300 |
| | LEFT | 600 | 400 | 200, 500, 200, 200 |
| DIRECTION OF FACE | FRONT | 700 | 100 | 25, 500, 150, 150 |
| | BACK | — | — | — |
| | RIGHT | 500 | 200 | 75, 25, 150, 300 |
| | LEFT | 550 | 300 | 450, 400, 200, 250 |
| PHOTOGRAPHED STATE OF FACE | | 700 | 100 | 25, 500, 150, 150 |
| PHOTOGRAPHED REGION | WHOLE BODY | 580 | 300 | 450, 400, 200, 250 |
| | UPPER HALF BODY OR MORE | 600 | 400 | 200, 500, 200, 200 |
| | FACE | 700 | 100 | 25, 500, 150, 150 |

FIG. 7

| IMAGE EXAMPLE | | | | |
|---|---|---|---|---|
| IMAGE NUMBER | 100 | 200 | 300 | 400 |
| DIRECTION OF BODY | FRONT | RIGHT | LEFT | LEFT |
| DIRECTION OF FACE | FRONT | RIGHT | LEFT | FRONT |
| PHOTOGRAPHED REGION | ONLY FACE | WHOLE BODY | WHOLE BODY | ONLY UPPER HALF BODY |
| FACE IMAGING SCORE | 700 | 500 | 550 | 670 |
| HUMAN BODY IMAGING SCORE | 600 | 550 | 580 | 600 |
| SUBJECT COORDINATES (x, y, width, height) | 25, 500, 150, 150 | 75, 25, 150, 300 | 450, 400, 200, 250 | 200, 500, 200, 200 |

FIG. 8

| RECOGNITION PRECONDITION | | SCORE | RECOMMENDED IMAGE | RECOMMENDED PROCESSING REGION (x, y, width, height) |
|---|---|---|---|---|
| DIRECTION OF BODY | FRONT | 600 | 100 | 25, 500, 150, 150 |
| | BACK | — | — | — |
| | RIGHT | 550 | 200 | 75, 25, 150, 300 |
| | LEFT | 600 | 400<br>500 | 200, 500, 200, 200 (FOR IMAGE 400)<br>120, 200, 100, 300 (FOR IMAGE 500) |
| DIRECTION OF FACE | FRONT | 700 | 100<br>500 | 25, 500, 150, 150 (FOR IMAGE 100)<br>125, 200, 75, 75 (FOR IMAGE 500) |
| | BACK | — | — | — |
| | RIGHT | 500 | 200 | 75, 25, 150, 300 |
| | LEFT | 700 | 500 | 125, 200, 75, 75 (FOR IMAGE 500) |
| PHOTOGRAPHED STATE OF FACE | WHOLE BODY | 600 | 100 | 25, 500, 150, 150 (FOR IMAGE 100) |
| | | | 500 | 125, 200, 75, 75 (FOR IMAGE 500) |
| PHOTOGRAPHED REGION | UPPER HALF BODY OR MORE | 600 | 400<br>500 | 200, 500, 200, 200 (FOR IMAGE 400)<br>120, 200, 100, 300 (FOR IMAGE 500) |
| | FACE | 700 | 100<br>500 | 25, 500, 150, 150 (FOR IMAGE 100)<br>125, 200, 75, 75 (FOR IMAGE 500) |

FIG. 9

| | RECOGNITION TARGET | ITEM TO BE CONSIDERED |
|---|---|---|
| BODY FEATURE | GENDER | FACE IS CONTAINED IN IMAGE, FACE FRONT |
| | AGE | FACE IS CONTAINED IN IMAGE, FACE FRONT |
| | BODY HEIGHT | WHOLE BODY IS CONTAINED IN IMAGE |
| | SKIN COLOR | FACE IS CONTAINED IN IMAGE |
| | HAIR COLOR | FACE IS CONTAINED IN IMAGE |
| | HAIR LENGTH | FACE IS CONTAINED IN IMAGE |
| | BEARD | FACE IS CONTAINED IN IMAGE, FACE FRONT |
| | GAIT | WHOLE BODY IS CONTAINED IN IMAGE |
| CLOTHES | TOP | UPPER HALF BODY IS CONTAINED IN IMAGE |
| | BOTTOM | WHOLE BODY IS CONTAINED IN IMAGE |
| | GLASSES | FACE IS CONTAINED IN IMAGE, FACE FRONT |
| | BACKPACK | WHOLE BODY IS CONTAINED IN IMAGE, BODY BACK |
| | BAG | WHOLE BODY IS CONTAINED IN IMAGE |

IMAGE PROCESSING APPARATUS, IMAGE PROCESSING METHOD, AND STORAGE MEDIUM THAT RECOGNIZE AN IMAGE BASED ON A DESIGNATED OBJECT TYPE

BACKGROUND OF THE INVENTION

Field of the Invention

The present invention relates to an image processing apparatus, an image processing method, and a storage medium.

Description of the Related Art

In recent years, there are increasing needs to recognize an image recorded by a network camera and utilize additional information acquired from the recognition result for system services. Examples of use cases include retrieval of a specific person, estimation of attributes (gender, age, and the like) of a subject, and displaying of a moving locus of a human body. A known technique concerning image processing and feature detection or recognition necessary for achieving such a system is described in a comprehensive manner in "Computer Vision: Algorithms and Applications" by Richard Szeliski, published by Kyoritsu Shuppan Co., Ltd., March, 2013. In Japanese Patent Application Laid-Open No. 2002-373332, there is disclosed a method of detecting an object from a motion vector, estimating a retrieving position in a next image based on the detection result, and tracking the object by template matching.

There is even a case where not only image recognition for an image acquired in real time but also recognition re-processing for a past recorded image needs to be carried out. In Japanese Patent No. 5193944, there is disclosed a technique for retrieving a newly registered person from a past recorded image by batch processing. The number of past recorded images greatly increases depending on the frame rate and size of an image to be captured or a processing period of time. Thus, in the technique disclosed in Japanese Patent No. 5193944, a change amount between images is calculated in advance in real-time processing, and recognition processing is carried out in re-processing only for a region where a change of a predetermined amount or more is recognized.

Not only in the system for retrieving the human face but also in other image recognition systems, re-processing of the recorded image is often carried out. For example, in the case of a system for retrieving/identifying the person by using attribute information such as the body height, the gender, or clothes, the attribute information to be extracted from one photographing target is diverse. Image recognition processing of several attributes to be extracted is carried out for one region. This may create a case where all pieces of attribute information for all subjects cannot be extracted in real time. In such a case, a necessary attribute needs to be detected for each past recorded image if necessary.

When the image recognition system is built, a plurality of network cameras are generally arranged without blind angles. If image recognition processing is carried out by using a personal computer (PC), it is desired to deal with more network cameras with a smaller number of apparatus.

No matter how high an image recognition processing speed is, when the re-processing is carried out for the past recorded image, it is not easy to prevent a processing amount/processing time from being much greater. For example, when 10 images are recorded per second, 600 images are acquired per minute and 36,000 images are acquired per hour. When the number of network cameras is 10, 3.6 million images need to be processed even in the case of re-processing for images of the past hour.

When there are a plurality of image recognition results to be acquired as in the case of the attributes such as the body height, the gender, and clothes, processing time is longer. For example, when 20 attributes are detected for one person, assuming that 50 milliseconds are needed for detecting one attribute, 1 second is necessary for completing recognition processing of one person.

SUMMARY OF THE INVENTION

According to an embodiment, an image processing apparatus including an acquisition unit configured to acquire results of analysis processing for a plurality of images; a designation unit configured to designate a type of a target to be detected from an image; and a determination unit configured to determine, among the plurality of images, an image used for detection processing of the detection target designated by the designation unit based on the type of the detection target designated by the designation unit and the result of the analysis processing.

Further features of the present invention will become apparent from the following description of exemplary embodiments with reference to the attached drawings.

BRIEF DESCRIPTION OF THE DRAWINGS

FIG. 4 is a table illustrating calculation results of the image recognition precondition calculation unit.

FIG. 6 is a table illustrating calculation results of the re-processing recommended region calculation unit before updating.

FIG. 7 is a table illustrating a photographed state, a score, and a region of an object in a past image.

FIG. 8 is a table illustrating calculation results of the re-processing recommended region calculation unit after updating.

FIG. 9 is a table illustrating a relationship between a recognition target and an item to be considered for the recognition target.

DESCRIPTION OF THE EMBODIMENTS

The exemplary embodiments of the present invention are described in detail with reference to the drawings. The configurations of the exemplary embodiments described below are only examples, and in no way limitative of the present invention.

Figure 1:
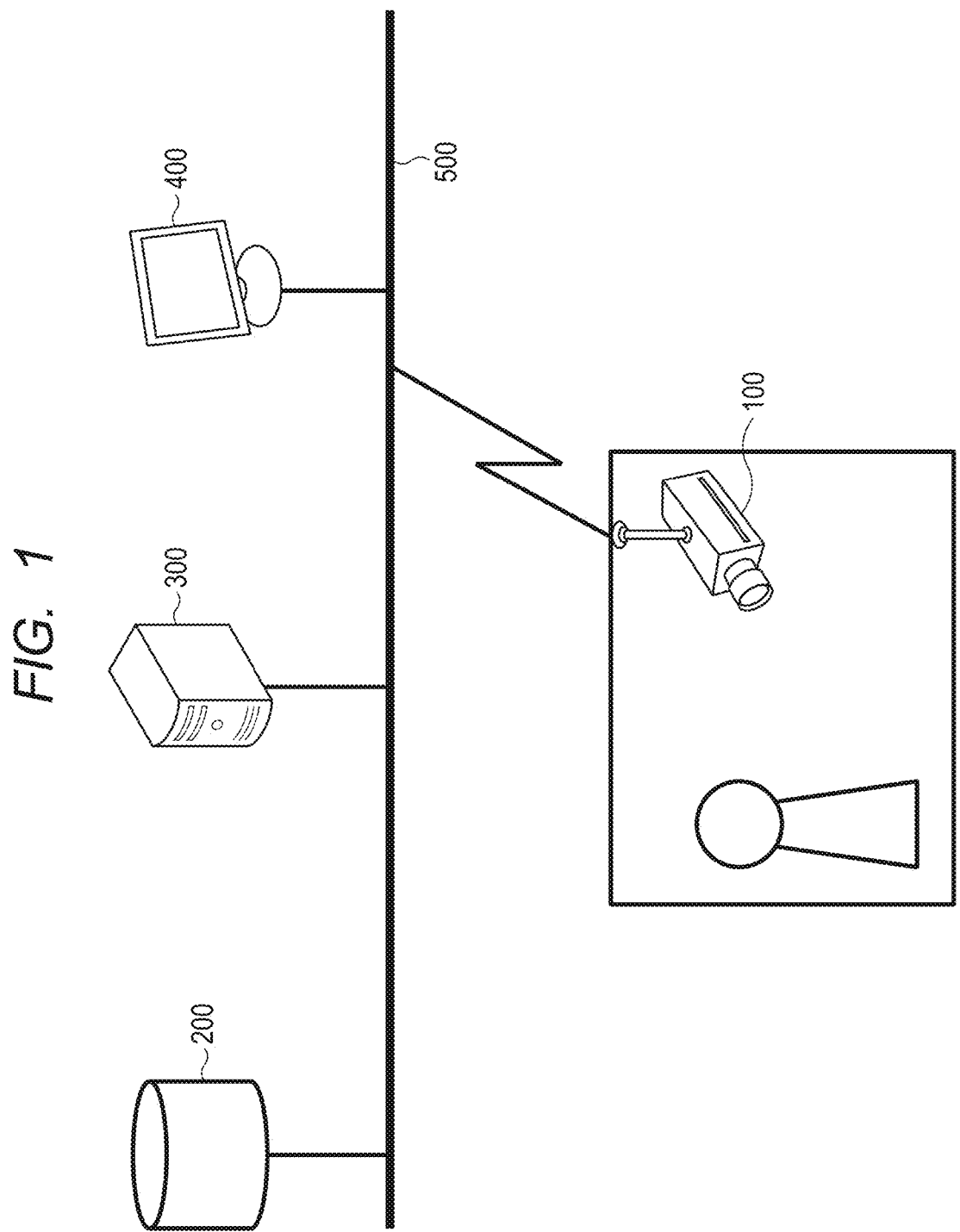
FIG. 1 is a diagram illustrating a configuration of a network system.

FIG. 1 is a diagram illustrating an example of a configuration of a network system (image recognition system). In FIG. 1, a network camera 100, a network storage apparatus 200, an image recognition server apparatus 300, and an image display apparatus 400 are interconnected via a local area network (LAN) 500 that is an example of a network line.

The network camera 100 is an example of an imaging apparatus. The network camera 100 has a function of photographing a target to be photographed and simultaneously executing image recognition processing such as object detection, tracking, or face recognition for the photographed image.

The network storage apparatus 200 is an example of a recording apparatus. The network storage apparatus 200 receives, via the LAN 500, and records image data photographed by the network camera 100 or results of the image recognition processing executed in the network camera 100.

The image recognition server apparatus 300 performs image recognition processing for past image data recorded in the network storage apparatus 200. The image display apparatus 400 superimposes results of the image recognition processing on the image data recorded in the network storage apparatus 200 to reproduce the image data recorded in the network storage apparatus 200. Further, the image display apparatus 400 has a function of providing an input unit configured to perform various operations such as retrieval of a person.

Figure 2:
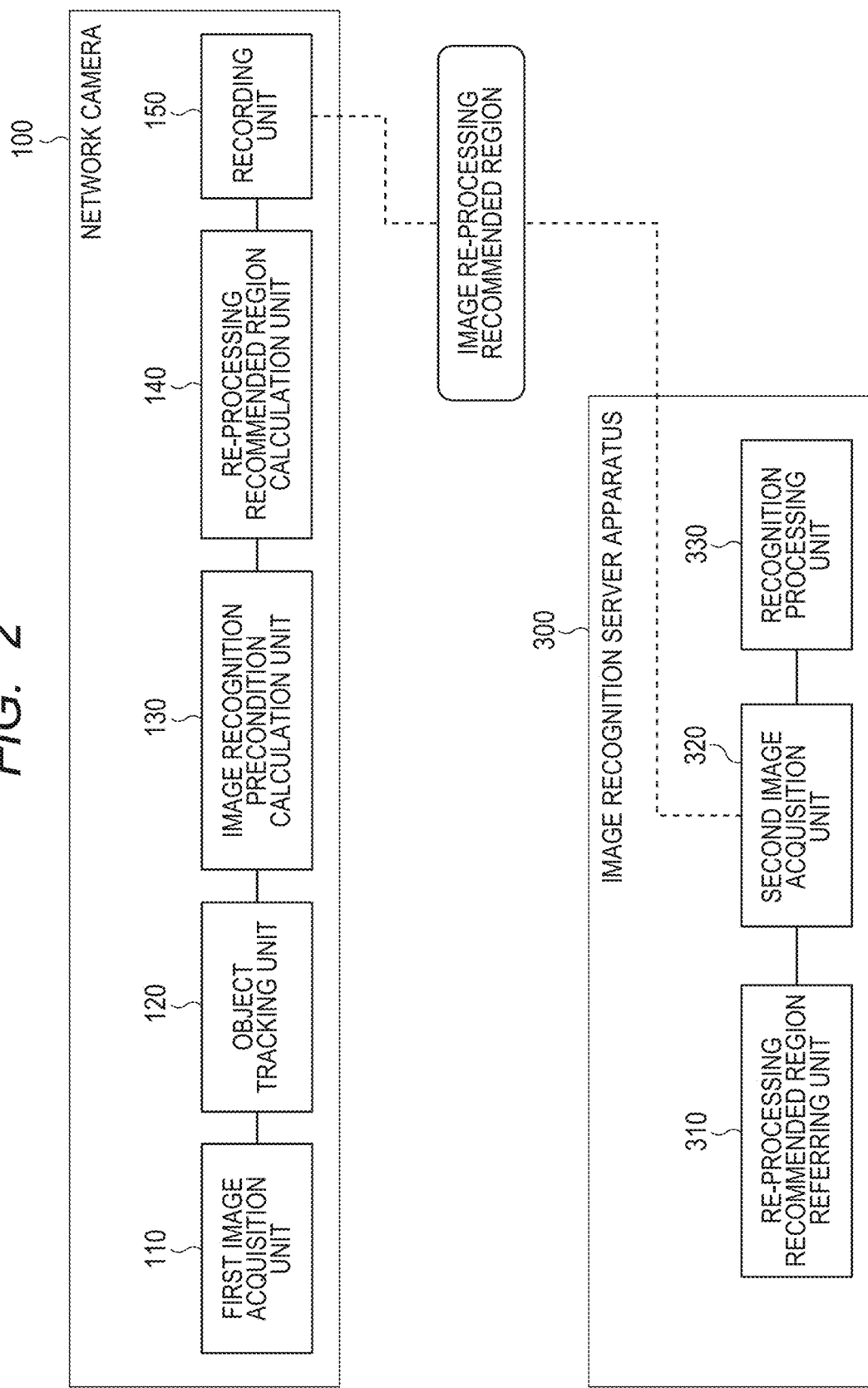
FIG. 2 is a diagram illustrating a functional configuration of the network system.

FIG. 2 is a block diagram illustrating an example of a functional configuration of the network system (network camera 100 and image recognition server apparatus 300). Specifically, FIG. 2 illustrates an example of a functional configuration for executing first image recognition processing by the network camera 100 and a functional configuration for executing second image recognition processing by the image recognition server apparatus 300.

A first image acquisition unit 110 executes predetermined pixel interpolation processing or color conversion processing for a digital electric signal acquired from an image pickup element such as a complementary metal oxide semiconductor (CMOS), to thereby develop/generate a digital image of RGB or YUV, etc. Further, the first image acquisition unit 110 executes image correction processing such as white balance, sharpness, contrast, or color conversion for the developed digital image.

An object tracking unit 120 processes the digital image acquired from the first image acquisition unit 110, and assigns a unique ID to the same object appearing over a plurality of images in a time axis direction. The object may be a human body, a moving body, or a car. For a specific processing procedure of assigning the unique ID to the same object, for example, the method disclosed in Japanese Patent Application Laid-Open No. 2002-373332 can be applied.

Figure 3:
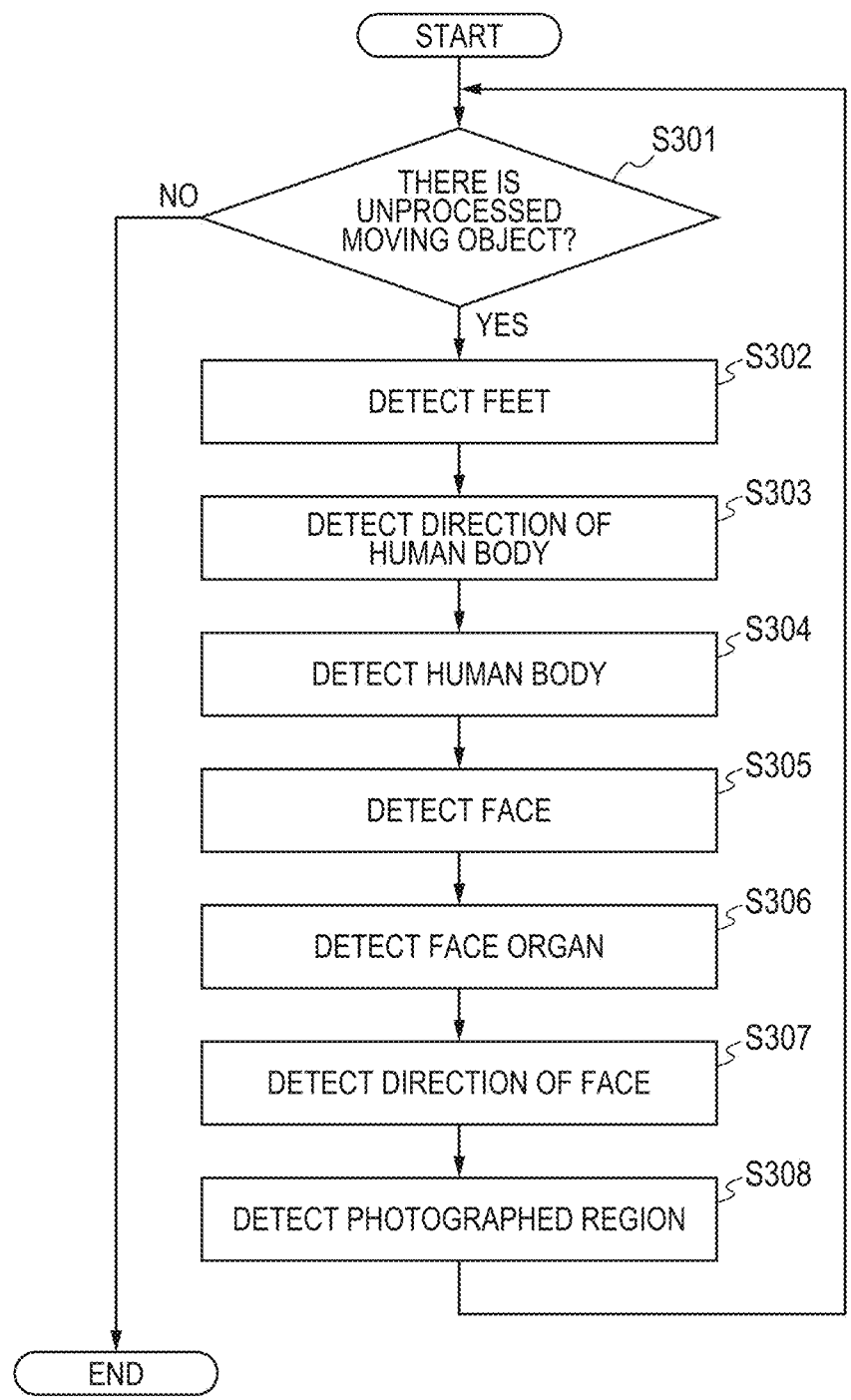
FIG. 3 is a flowchart illustrating processing of an image recognition precondition calculation unit.

An image recognition precondition calculation unit 130 calculates whether or not each of the objects (objects having the same ID) detected by the object tracking unit 120 satisfies an image recognition precondition. FIG. 3 is a flowchart illustrating an example of processing of the image recognition precondition calculation unit 130. For the specific image recognition processing to be described below, for example, contents of Recognition in Chapter 14, "Computer Vision: Algorithms and Applications" by Richard Szeliski, published by Kyoritsu Shuppan Co., Ltd., March, 2013 can be applied.

In Step S301, the image recognition precondition calculation unit 130 determines whether there is any unprocessed object having an ID allocated thereto. When the results of the determination illustrates that there is no unprocessed object having an ID allocated thereto, the processing of the flowchart illustrated in FIG. 3 is ended, and a photographed state of the object is calculated in processing thereafter. When there are unprocessed objects having IDs allocated thereto, the image recognition precondition calculation unit 130 selects one of the unprocessed objects having IDs allocated thereto, and carries out processing of Steps S302 to S308 for the object having an ID allocated thereto.

In this embodiment, specifically, a photographed state of the object is determined by confirming an imaging range of the object such as whether a face is contained in the image, whether an upper half body is contained in the image, or whether a whole body is contained in the image. Accordingly, in Step S302, the image recognition precondition calculation unit 130 detects feet. In Step S304, the image recognition precondition calculation unit 130 detects a human body. In Step S305, the image recognition precondition calculation unit 130 detects a face. Whether a face is contained in the image is determined based on, for example, whether the face has been successfully detected. Whether an upper half body is contained in the image is determined based on, for example, whether the face and the human body have been successfully detected. Whether a whole body is contained in the image is determined based on, for example, whether the face, the human body, and the feet have been successfully detected. Therefore, in the example illustrated in FIG. 3, in Step S308, the image recognition precondition calculation unit 130 detects a region where the object is photographed.

The results of the image recognition processing may be dependent on a direction of a recognition target. Accordingly, the image recognition precondition calculation unit 130 detects a direction of each of the face, the upper half body, and the whole body in each image. In the example illustrated in FIG. 3, in Step S303, the image recognition precondition calculation unit 130 detects the direction of the human body. In Step S307, the image recognition precondition calculation unit 130 detects the direction of the face. The image recognition precondition calculation unit 130 may refer to the results of previous tracing of an object, compare a current image with a previous image, and determine a moving direction of the face or the human body, to thereby substitute this moving direction for a direction of the face or the human body.

During each detection, the image recognition precondition calculation unit 130 simultaneously acquires scores at the time of detection. In this embodiment, with this score, whether the object is photographed in a desired manner is digitized. In some cases, detection of attribute information on a face is carried out on condition that an organ such as an eye, a nose, or a mouth forming the face has been successfully detected (in the description below, an organ forming a face is referred to as face organ when necessary). Thus, in the example illustrated in FIG. 3, in Step S306, the image recognition precondition calculation unit 130 executes face detection processing only for the face to detect each organ of the face, and calculates a score of a detection result of each face organ.

The image recognition precondition calculation unit 130 can also execute face recognition to calculate a score of the results of the face recognition. When executing the face recognition, for example, the image recognition precondition calculation unit 130 derives a feature point from the detection result of the face organ.

The score is an example of reliability of a detection result or a recognition result of each portion of the object or the whole object. Specifically, for example, a degree of similarity between information (library) on each portion of a preregistered object or the whole object and the detection result/recognition result can be calculated as a score. Without any comparison with the library, the image recognition precondition calculation unit 130 may compare a current detection/recognition result with a content that has already been detected or recognized, and calculate a degree of similarity therebetween as a score.

In addition, there is a method of using, as a score, an area (number of pixels) of a detection region of the object contained in an image. As an area is larger, a contained object may be larger, and more suited for recognition. Thus, as illustrated in FIG. 4, in this embodiment, the image recognition precondition calculation unit 130 calculates a subject face size that is a size of a circumscribed rectangular region of the face and a subject whole body size that is a size of a circumscribed rectangular region of the whole body.

Further, the image recognition precondition calculation unit 130 may derive a score by combining those values. For example, the image recognition precondition calculation unit 130 may multiply those values by a predetermined coefficient and add the resultant values together. When the above-mentioned processing is carried out for each image, a result illustrated in FIG. 4 is acquired for each ID. FIG. 4 illustrates, in a table form, an example of a calculation result of the image recognition precondition calculation unit 130 for one object of one image. In FIG. 4, a face imaging score is acquired when the face is detected. A human body imaging score is acquired when the human body is detected.

As illustrated in FIG. 4, in this embodiment, the image recognition precondition calculation unit 130 calculates subject face coordinates that are coordinates of the circumscribed rectangular region of the face and subject whole body coordinates that are coordinates of the circumscribed rectangular region of the whole body. In the description below, the subject face coordinates and the subject whole body coordinates may be collectively referred to as subject coordinates when necessary. Through the above-mentioned processing, attributes of each object (each ID) contained in the image acquired by the first image acquisition unit 110 are acquired.

Figure 5:
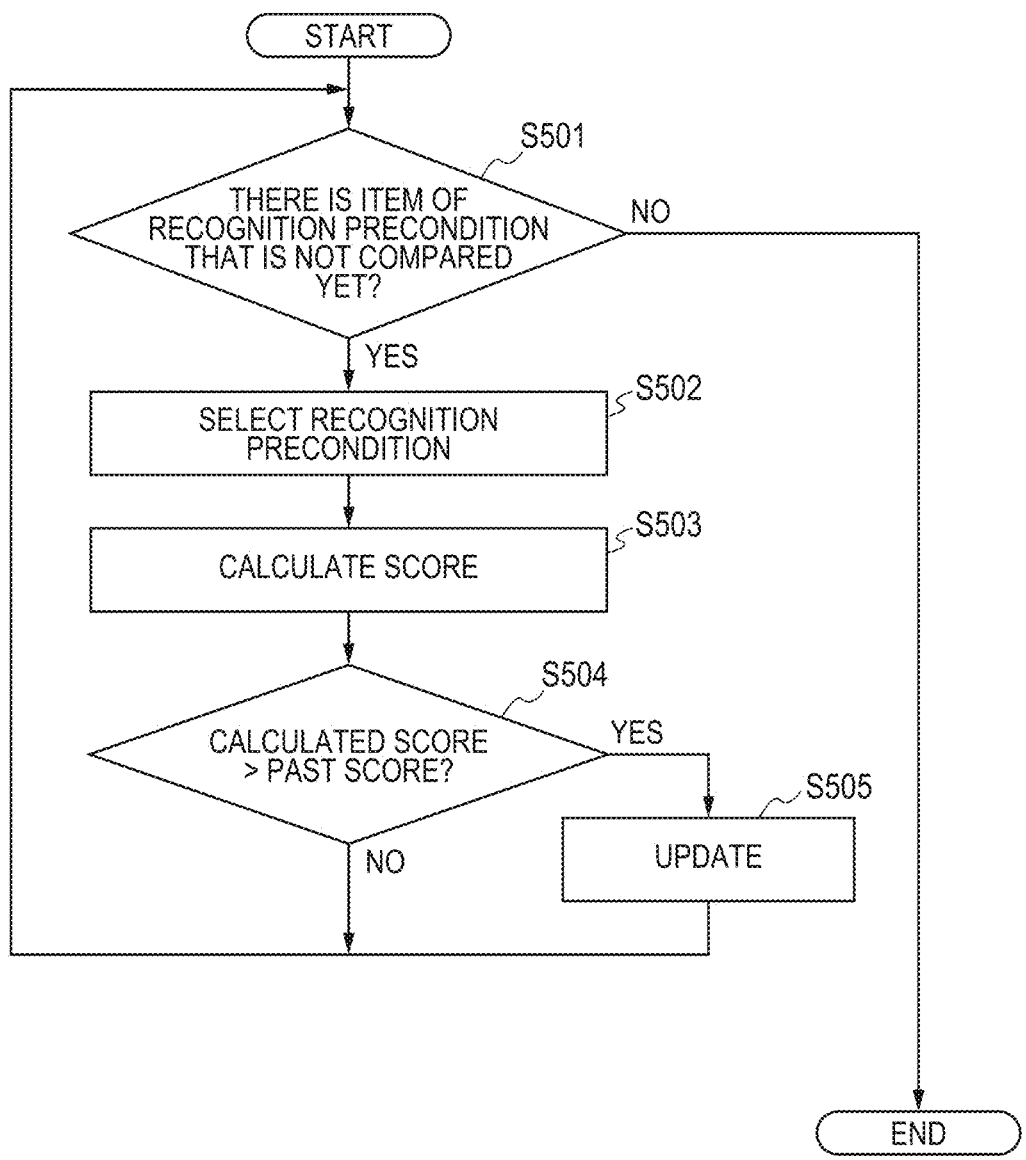
FIG. 5 is a flowchart illustrating processing of a re-processing recommended region calculation unit.

A re-processing recommended region calculation unit 140 compares, after the completion of the processing of the image recognition precondition calculation unit 130, an image currently most suited for re-processing with a last processed image, and updates a re-processing recommended region. FIG. 5 is a flowchart illustrating an example of processing of the re-processing recommended region calculation unit 140. FIG. 6 illustrates, in a table form, an example of a calculation result of the re-processing recommended region calculation unit 140 for one object. The processing of the flowchart illustrated in FIG. 5 is individually carried out for each of the objects of the same ID.

In Step S501, the re-processing recommended region calculation unit 140 determines whether there is any item of a recognition precondition that is not compared yet. The recognition precondition is necessary for recognizing attributes of an object, and acquired from the calculation result of the image recognition precondition calculation unit 130. When the object is a human body, in the example of FIG. 6, as a plurality of items of the recognition precondition, items (e.g., "body direction is front" and "face direction is front") illustrated in a column of the recognition precondition of FIG. 6 are set in advance. As illustrated in FIG. 6, each item forming the recognition precondition is determined based on a photographed state of the object in the image.

When the results of the determination illustrated that there is no item of recognition precondition that is not compared yet, the processing of the flowchart illustrated in FIG. 5 is ended.

On the other hand, when there is an item of recognition precondition that is not compared yet, the processing proceeds to Step S502. In Step S502, the re-processing recommended region calculation unit 140 selects one of the unselected recognition preconditions.

Then, in Step S503, the re-processing recommended region calculation unit 140 calculates a score to be used for comparison with an image currently most suited for re-processing and corresponding to the recognition precondition selected in Step S502. This score is calculated by using, for example, the calculation result of the image recognition precondition calculation unit 130. The score calculated in Step S503 is an example of an evaluation value for evaluating certainty of each portion of the objet or the whole object.

In the example illustrated in FIG. 6, the re-processing recommended region calculation unit 140 derives a score of a body direction as a score at the time of detecting the human body in the flowchart illustrated in FIG. 3. The re-processing recommended region calculation unit 140 derives scores of a face direction and a photographed state of a face as scores at the time of detecting the face in the flowchart illustrated in FIG. 3. The re-processing recommended region calculation unit 140 derives a score of a photographed region as a score at the time of detecting the photographed region in the flowchart illustrated in FIG. 3. For example, when the photographed regions are a whole body, an upper half body or more, and a face, the scores acquired when the human body, the human body, and the face are detected are adopted, respectively. When the scores calculated in the flowchart illustrated in FIG. 3 are directly used, there is no need to calculate a score again in Step S503.

In FIG. 6, in a column of a recommended image, a number of an image recommended to be used for re-processing is stored. In a column of a recommended processing region, subject coordinates corresponding to the item of the recognition precondition are stored. In the example illustrated in FIG. 6, when the items of the recognition precondition are the body direction and the photographed region (whole body/upper half body or more), subject whole body coordinates are stored in the recommended processing region. On the other hand, when the items of the recognition precondition are the face direction, the photographed state of the face, the photographed region (face), and the photographed region (whole body/upper half body or more), subject face coordinates are stored in the recommended processing region.

Then, in Step S504, the re-processing recommended region calculation unit 140 compares the score calculated in Step S503 with the score of the image currently most suited for re-processing and corresponding to the recognition precondition selected in Step S502. In this case, the re-processing recommended region calculation unit 140 determines whether the score calculated in Step S503 is larger than the score of the image currently most suited for re-processing and corresponding to the recognition precondition selected in Step S502. When the results of the determination illustrate that the score calculated in Step S503 is no larger than the score of the image currently most suited for re-processing and corresponding to the recognition precondition selected in Step S502, the processing returns to Step S501.

On the other hand, when the score calculated in Step S503 is larger than the score of the image currently most suited for re-processing and corresponding to the recognition precondition selected in Step S502, the processing proceeds to Step S505.

In Step S505, the re-processing recommended region calculation unit 140 changes the content of the item of the recognition precondition selected in Step S502 to that of the image currently acquired by the first image acquisition unit 110 to update this item. Then, the processing returns to Step S501.

Through the above-mentioned processing, the content of the item of the recognition precondition of each ID is acquired.

FIG. 7 illustrates an example of a photographed state, a score, and a region (subject coordinates) of an object acquired in a past image. In FIG. 7, the subject face size and the subject whole body size illustrated in FIG. 4 are not illustrated. In FIG. 7, as the subject coordinates, only subject coordinates of a successfully detected region of the face or the human body are illustrated.

It is assumed that in past image recognition processing, four images illustrated in FIG. 7 are determined to be images suited for re-processing. Calculation results of the re-processing recommended region calculation unit 140 for these four images are illustrated in FIG. 6. In this case, the re-processing recommended region calculation unit 140 updates, by comparison of FIG. 6 with FIG. 4, the content of each item of the recognition precondition from a content illustrated in FIG. 6 to that illustrated in FIG. 8. In FIG. 8, a cell with the gray background indicates an updated item, and an underlined value is an updated value. As an image suited for re-processing (recommended image), one image having the highest score may be left, or a plurality of images may be left as images suited for re-processing when scores are within a predetermined difference. A predetermined number of images may be left as images suited for re-processing in descending order of scores. FIG. 8 illustrates an example where all images best (highest) in score are set as recommended images.

Referring back to FIG. 2, a recording unit 150 executes, for delivery or saving, compression/coding for the acquired image data. A compression method for delivery is based on a standard such as Moving Picture Experts Group (MPEG) 4, H.264, Motion Joint Photographic Experts Group (MJPEG), or Joint Photographic Experts Group (JPEG). Further, the recording unit 150 files the image data by a file format such as MP4 or mov. The re-processing recommended region of each object and the filed image compression data are transmitted to the network storage apparatus 200 or the image recognition server apparatus 300 via the LAN 500. These apparatus record the image data on a network file system such as Network File System (NFS) or Common Internet File System (CIFS).

Next, an example of re-recognition processing for a past image is described. The user operates a user interface connected to the image display apparatus 400 to instruct execution of processing for retrieving a specific object (e.g., person) from the past image. Here, as an example of retrieval conditions, a case of retrieving a male wearing glasses and around 170 cm is described. The latest content of each item of the recognition precondition is as illustrated in FIG. 8.

When given the instruction, the image recognition server apparatus 300 executes the re-recognition processing for the past image.

A re-processing recommended region referring unit 310 illustrated in FIG. 2 selects, based on a relationship between a recognition target instructed by the user and an item to be considered in the case of the recognition target, an item of the image recognition precondition corresponding to the recognition target. FIG. 9 illustrates an example of the relationship between the recognition target and the item to be considered in the case of the recognition target. This relationship is set in advance.

In this case, the person wearing glasses and the male are retrieved, and hence as illustrated in FIG. 9, a search needs to be carried out for an image in which a face is contained from the front. Further, a body height is designated, and hence as illustrated in FIG. 9, a search needs to be carried out for an image in which a whole body is contained.

Then, a second image acquisition unit 320 acquires a relevant image and a recommended processing region in the image. In this case, a current re-processing recommended region is assumed to be the content illustrated in FIG. 8. As illustrated in FIG. 9, to detect glasses, the image in which the face is contained from the front needs to be processed. Accordingly, (x, y, width, height) of image numbers 100 and 500=(25, 500, 150, 150), (125, 200, 75, 75) needs to be processed. As illustrated in FIG. 9, to estimate a body height, the image in which the whole body is contained needs to be processed. Accordingly, (x, y, width, height) of the image number 500=(120, 200, 100, 300) needs to be processed. As illustrated in FIG. 9, to estimate an age, the image in which the face is contained from the front needs to be processed. Accordingly, (x, y, width, height) of the image numbers 100 and 500=(25, 500, 150, 150), (125, 200, 75, 75) needs to be processed. Therefore, the second image acquisition unit 320 acquires recommended processing regions of the image numbers 100 and 500.

Then, a recognition processing unit 330 carries out actual image recognition processing for the recommended processing region of the image acquired by the second image acquisition unit 320.

The re-processing recommended region referring unit 310, the second image acquisition unit 320, and the recognition processing unit 330 can efficiently carry out re-recognition processing for the past image by repeatedly executing the processing for each ID assigned by the object tracking unit 120.

Not all of the past images can be subjected to re-recognition processing. Whether or not the image can be subjected to re-recognition processing is greatly dependent on a photographed state of the subject. When recognition processing is carried out for the face, it is desired to execute image recognition processing for an image enabling secure detection of a face organ such as an eye, a nose, or a mouth and having the face organ clearly contained large therein. To estimate a body height, it is desired to execute image recognition processing for an image in which a whole body from head to toe is contained. Moreover, to end the re-recognition processing highly accurately within short time, a suitable image needs to be selected from among past images.

Thus, in this embodiment, for each of the plurality of items of the recognition precondition, a score of an object contained in the image is derived for each object contained in the image. Evaluation values of the same item of the same object are compared with each other between an image acquired in the past and a newly acquired image. An image corresponding to the item of the object and a recommended processing region in the image are derived from the results of the comparison, and information for specifying the image and the recommended processing region is registered. Accordingly, an image suited to re-recognition processing for the past image is selected, and the recommended processing region in the image is acquired in advance.

Then, when re-recognition processing is carried out for the past image, an item (item to be considered) corresponding to the recognition target designated by the user is derived, and an image corresponding to the derived item and a recommended processing region of the image are extracted. Then, image recognition processing is carried out for the extracted recommended processing region of the image. In this way, in the re-recognition processing, the recommended processing region of the image suited for the recognition target is extracted, and the image recognition processing is carried out for the extracted recommended processing region.

Therefore, without any reduction in recognition accuracy or any increase of processing time caused by processing of an inappropriate image during the image re-recognition processing, an amount and time of re-recognition processing can be greatly reduced and shortened by processing an image suited for recognition.

According to one embodiment of the present invention, the processing amount and processing time required for the image re-recognition processing can be reduced and shortened.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-105506, filed May 21, 2014, which is hereby incorporated by reference herein in its entirety.

What is claimed is:

1. An image processing apparatus comprising:
a hardware processor; and
a memory storing instructions executable by the hardware processor,
wherein the hardware processor executes the instructions stored in the memory to execute:
an acquisition task that acquires first information from each of a plurality of images, wherein the first information is related to a part of an object detected in each of the plurality of images;
a storing task that stores second information representing a relationship between the part of the object and an item to be considered in a case of recognizing a target object;
a designation task that accepts designation of a retrieval condition of a target object, wherein the retrieval condition includes third information describing the part of the target object;
a selection task that selects, from among the plurality of images, at least one image based on the item relating to the part of the target object included in the retrieval condition designated by the designation task; and
a detection task that detects the target object with regard to the images selected by the selection task.

2. The image processing apparatus according to claim 1, wherein:
the second information indicates a direction of a face detected in the image; and
the selection task, when the designation includes at least one feature of a gender, an age, or a face as the retrieval condition of the target object, selects at least one image based on the second information of the direction of the face.

3. The image processing apparatus according to claim 1, wherein:
the first information indicates a part of a human body in the image; and
the selection task, when the designation includes at least one of a body height, clothes, or belongings as the retrieval condition of the target object, selects at least one image based on the first information of the part of the human body.

4. The image processing apparatus according to claim 1, wherein:
the third information indicates a size of a human body in the image; and
the selection task selects, an image corresponding to a larger size of the human body.

5. The image processing apparatus according to claim 1, wherein the hardware processor executes the instructions stored in the memory to further execute:
a holding task that holds identification of an image applied to the detection of the target object for each retrieval condition that is designatable by the designation task.

6. An image processing method comprising the steps of:
acquiring first information from each of a plurality of images, wherein the first information is related to a part an object detected in each of the plurality of images;
storing second information representing a relationship between the part of the object and an item to be considered in a case of recognizing a target object;
accepting designation of a retrieval condition of a target object, wherein the retrieval condition includes third information describing the part of the target object;
selecting, from among the plurality of images, at least one image based on the item relating to the part of the target object included in the retrieval condition; and
detecting the target object with regard to the images selected in the selecting step.

7. The image processing method according to claim 6, wherein:
the second information indicates a direction of a face detected in the image; and the selection step, when the designation includes at least one feature of a gender, an age, or a face as the retrieval condition of the target object, selects at least one image based on the information of the direction of the face.

8. The image processing method according to claim 6, wherein:
the first information indicates a part of a human body in the image; and
the selection step, when the designation includes at least one of a body height, clothes, or belongings as the retrieval condition of the target object, selects at least one image based on the first information of the part of the human body.

9. The image processing method according to claim 6, wherein:
the third information indicates a size of a human body in the image; and
the selection step selects, an image corresponding to a larger size of the human body.

10. A non-transitory computer-readable medium storing a program executable by a computer to execute a method comprising the steps of:
acquiring first information from each of a plurality of images, wherein the first information is related to a part an object detected in each of the plurality of images;
storing second information representing a relationship between the part of the object and an item to be considered in a case of recognizing a target object;
accepting designation of a retrieval condition of a target object, wherein the retrieval condition includes third information describing the part of the target object;
selecting, from among the plurality of images, at least one image based on the item relating to the part of the target object included in the retrieval condition; and
detecting the target object with regard to the images selected in the selecting step.

* * * * *